US011927917B2

(12) United States Patent
Di Domenico et al.

(10) Patent No.: US 11,927,917 B2
(45) Date of Patent: Mar. 12, 2024

(54) MECHANICAL HOROLOGICAL MOVEMENT PROVIDED WITH AN ESCAPEMENT COMPRISING AN ANCHOR

(71) Applicant: The Swatch Group Research and Development Ltd, Marin (CH)

(72) Inventors: Gianni Di Domenico, Neuchatel (CH); Dominique Lechot, Les Reussilles (CH); Marc Stranczl, Nyon (CH); Benoît Légeret, Ecublens (CH)

(73) Assignee: The Swatch Group Research and Development Ltd, Marin (CH)

( * ) Notice: Subject to any disclaimer, the term of this patent is extended or adjusted under 35 U.S.C. 154(b) by 515 days.

(21) Appl. No.: 17/169,618

(22) Filed: Feb. 8, 2021

(65) Prior Publication Data

US 2021/0294269 A1 Sep. 23, 2021

(30) Foreign Application Priority Data

Mar. 18, 2020 (EP) .................................... 20164019

(51) Int. Cl.
*G04B 15/10* (2006.01)
*G04B 15/14* (2006.01)

(52) U.S. Cl.
CPC ............. *G04B 15/10* (2013.01); *G04B 15/14* (2013.01)

(58) Field of Classification Search
CPC ................................ G04B 15/10; G04B 15/14
See application file for complete search history.

(56) References Cited

U.S. PATENT DOCUMENTS

| | | | |
|---|---|---|---|
| 3,583,152 A | 6/1971 | Lawson |
| 2008/0219103 A1 | 9/2008 | Baumberger et al. |
| 2013/0148480 A1 | 6/2013 | Charbon et al. |

FOREIGN PATENT DOCUMENTS

| | | |
|---|---|---|
| CH | 703 449 A2 | 1/2012 |
| CH | 703 476 A2 | 1/2012 |

(Continued)

OTHER PUBLICATIONS

European Search Report dated Nov. 2, 2020 in European Application 20164019.0 filed on Mar. 18, 2020 (with English Translation of Categories of Cited Documents), 5 pages.

(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

The horological movement includes a mechanical resonator and an escapement including an escapement wheel, which has a plurality of teeth, and an anchor formed by a stick and two arms having respectively two mechanical pallets likely to come into contact, when the anchor is subject to an alternative movement, with any of the teeth according to the angular position of the escapement wheel. To avoid damage to the escapement during rocking of the anchor while the escapement wheel is positioned in an unfavourable angular position, the anchor is arranged, during the rocking of this anchor, to be able to bend being subjected to an elastic deformation. The anchor has an elastic capacity between each of the two mechanical pallets and a fork of the anchor, enabling it to absorb elastically, during the elastic deformation, a maximum mechanical energy that the mechanical resonator can have during the normal functioning of the horological movement.

10 Claims, 2 Drawing Sheets

(56) References Cited

FOREIGN PATENT DOCUMENTS

| | | | | |
|---|---|---|---|---|
| CH | 703449 | A2 | * | 1/2012 |
| CH | 706 756 | A2 | | 1/2014 |
| CN | 1427316 | A | * | 7/2003 |
| CN | 106909053 | A | | 6/2017 |
| CN | 110412853 | A | | 11/2019 |
| EP | 2 400 352 | A1 | | 12/2011 |
| EP | 3037894 | A1 | * | 6/2016 |
| EP | 3182224 | A1 | * | 6/2017 |
| EP | 3217227 | A1 | * | 9/2017 |

OTHER PUBLICATIONS

Combined Chinese Office Action and Search Report dated May 13, 2022 in Chinese Patent Application No. 2021102921769, 6 pages.

* cited by examiner

MECHANICAL HOROLOGICAL MOVEMENT PROVIDED WITH AN ESCAPEMENT COMPRISING AN ANCHOR

CROSS-REFERENCE TO RELATED APPLICATION

This application claims priority to European Patent Application No. 20164019.0 filed on Mar. 18, 2020, the entire disclosure of which is hereby incorporated herein by reference.

TECHNICAL FIELD

The invention relates to horological movements comprising an escapement provided with an anchor cooperating, on the one hand, with an escapement wheel and, on the other hand, with a mechanical resonator, the anchor having a different axis of rotation from that of the mechanical resonator.

In particular, the invention relates to a horological movement provided with an escapement comprising a magnetic coupling system between an escapement wheel and an anchor. As in the case of a Swiss anchor, the anchor has an alternative movement which is synchronous with the periodic movement of the mechanical resonator, but different. Magnetic escapement is defined as an escapement provided with magnets arranged in part on the anchor and in part on the escapement wheel so as to create a magnetic coupling between the anchor and the escapement wheel.

TECHNOLOGICAL BACKGROUND

The escapement with a Swiss anchor has been known for a very long time. In normal functioning, the teeth of the escapement wheel cooperate with two pallets of the anchor in a defined manner, enabling a step-by-step rotation of the escapement wheel which is synchronous with the oscillation of the mechanical resonator, namely in general a spiral balance. When the force couple provided to the escapement wheel decreases due to the relaxation of the barrel spring, the maintenance pulses generated by the escapement and transmitted to the resonator reduce progressively in intensity such that, when the escapement wheel finally stops as said force couple becomes lower than a threshold value, the energy stored in the resonator is relatively low. Thus, the risk that a pallet or a tooth of the escapement wheel will get damaged during a potential termination shock between a pallet and a tooth, according to the angular stop position of the escapement wheel, is relatively low but not excluded. The situation is more problematic in the case of a horological movement provided with a drive system of constant force for the escapement wheel, as the resonator retains essentially the same mechanical energy all along the escapement function up to the stop of the escapement wheel and its drive. The risk of an accidental event on the completion of the horological movement is therefore increased.

SUMMARY OF THE INVENTION

The inventor has observed that the problem stated above becomes a major disadvantage in the case of a horological movement comprising a hybrid, magnetic and mechanical escapement. Indeed, it has been found that the risk of termination shock between the anchor and the escapement wheel is significantly increased in the case of a hybrid escapement, namely an escapement provided with a magnetic coupling system between the anchor and the escapement wheel, with ramps of potential magnetic energy making it possible to accumulate the potential magnetic energy in the escapement at each step of the step-by-step rotation of the escapement wheel before generating a magnetic pulse at the end of the step while this escapement wheel is idle, and therefore the escapement wheel comprises teeth provided to cooperate with mechanical pallets of the anchor in at least one functioning phase of the escapement (for example at the start-up and/or during the normal functioning of the horological movement to absorb at each step kinetic energy from the escapement wheel and possibly define angular stop positions for the escapement wheel, as will be explained in the detailed description of the invention). Indeed, this type of escapement combines the risks of the escapement wheel stopping in an angular position at risk when the resonator still has nominal mechanical energy. Firstly, the maintenance pulses are magnetic pulses with a constant value provided that the force couple provided to the escapement wheel is greater than or equal to a certain lower threshold. Then, as soon as said force couple is below said lower limit, the escapement wheel can no longer correctly climb the next potential magnetic energy ramp, such that the escapement wheel does not stop in the next normal angular stop position, but essentially at the bottom of a potential magnetic energy ramp or along the latter. From then, as the mechanical resonator oscillates normally during such an event, since it has previously received magnetic pulses of essentially constant intensity (nominal intensity), if a mechanical pallet is opposite a tooth during the next rocking of the anchor, a serious shock can occur and damage the escapement wheel or the anchor, or even the mechanical resonator. This broader technical problem, brought to light by the inventor, therefore requires an appropriate technical solution.

In a general manner, the present invention relates to a horological movement comprising a mechanical resonator, in particular a spiral balance, and an escapement, connected to this mechanical resonator, which is formed by an escapement wheel comprising a plurality of projecting parts, in particular teeth, and by an anchor provided with a fork, designed to cooperate with a pin of a mechanical resonator, and two mechanical pallets which are designed to cooperate with the plurality of teeth at least in a certain functioning phase of the horological movement. This horological movement is arranged such that during the rocking of the anchor from a first of its two rest positions in the direction of the second rest position when the escapement wheel is positioned in any angular position A of a plurality of angular positions corresponding respectively to the plurality of projecting, one of the two mechanical pallets of the anchor abuts against one of these projecting parts before said anchor can reach the angular disengagement position of the pin, integral with the mechanical resonator, from the side of the second rest position. According to the invention, the anchor is arranged so as to be able to bend, during this rocking of the anchor, in a general plane of the anchor parallel to its fork, being subject to an elastic deformation from the action of a force exerted by the pin of the mechanical resonator, engaged in the fork, on one of the two horns of this fork, while said mechanical pallet abuts against said projecting part and the mechanical resonator is braked by the anchor. Furthermore, this anchor has an elastic capacity, between each of the two mechanical pallets and the fork, enabling it to absorb in the form of elastic energy, during said elastic deformation, a maximum mechanical energy which the mechanical resonator can have during the normal functioning of the horological movement.

In a main embodiment, the escapement comprises a magnetic system magnetically coupling the escapement wheel and the anchor, this magnetic system being arranged so as to generate during the normal functioning of the horological movement, magnetic pulses having a substantially constant energy for maintaining an oscillation of the mechanical resonator via interaction between the pin of this mechanical resonator and the fork of the anchor.

In one particular variant, said magnetic pulses are generated at two mechanical pallets which support respectively two magnets forming two magnetic pallets. The anchor is arranged, during the normal functioning of the horological movement, to be able to transmit essentially a magnetic force couple generated by each of the magnetic pulses to its fork to maintain an oscillation of the mechanical resonator.

BRIEF DESCRIPTION OF THE FIGURES

The invention is described in more detail in the following with reference to the accompanying drawings, given by way of example without any limitations, wherein FIGS. 1A to 1F partially show a horological movement, according to main embodiment of the invention, represented in successive positions following a stop of the escapement wheel in a particular angular position.

DETAILED DESCRIPTION OF THE INVENTION

Figure 1A:
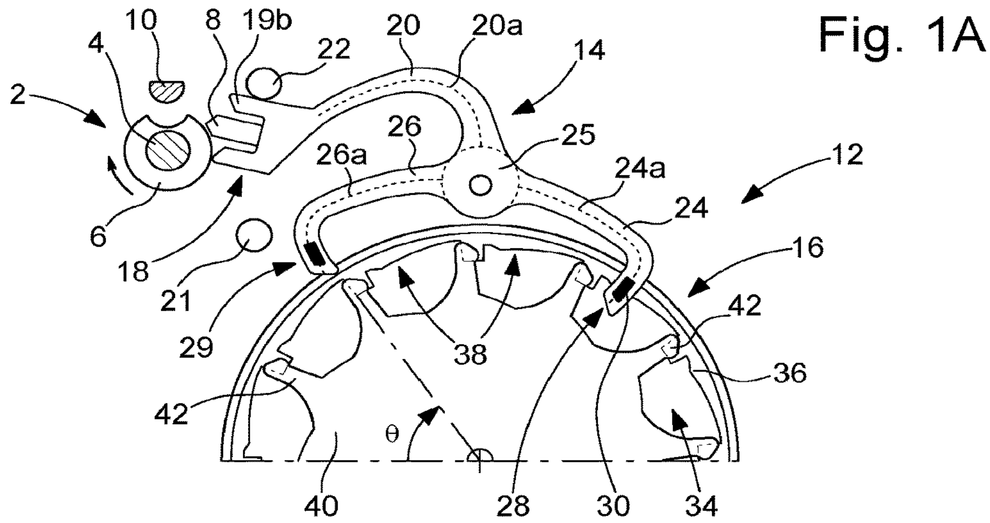

By means of the accompanying FIGURES a main embodiment of a horological movement according to the invention is described, which is of the mechanical type and comprises a mechanical resonator 2, where only the axis 4, the small disk 6 with a notch and the pin 10 are shown. The horological movement comprises an escapement 12 which is associated with the mechanical resonator, the small disk and the pin being elements forming this escapement. The escapement 12 further comprises an escapement wheel 16 and an anchor 14 which is an element separate from the mechanical resonator and the single axis of rotation of which is different from that of this mechanical resonator.

The anchor 14 is formed, on the one hand, by a stick 20 terminated by a fork 18, comprising two horns 19*a* and 19*b*, and by a guard pin 8 and, on the other hand, by two arms 24 and 26 the free ends of which form respectively two mechanical pallets 28 and 29. The two mechanical pallets support respectively two magnets 30 and 32 which form two magnetic pallets of the anchor 14. The mechanical resonator 2 is coupled to the anchor such that, when the mechanical resonator oscillates normally, this anchor is subject to an alternative movement, synchronised with the oscillation of the mechanical resonator, between two rest positions, defined by two limitation pins 21 and 22, in which the anchor remains alternatively during successive time intervals.

The escapement wheel 16 comprises a periodic magnetised structure 36 which is arranged on a disk 34, preferably made from a non-magnetic material (not conducting magnetic fields so as not to make the escapement wheel sensitive to external magnetic fields which could exert a significant force couple on said escapement wheel if this disk were made from a ferromagnetic material). The structure 36 has magnetised portions 38, globally in an arc of a circle, which define increasing ramps of potential magnetic energy for the two magnetic pallets 30 and 32, which each have an axial magnetisation with an opposite polarity to that of the axial magnetisation of the periodic magnetised structure so as to create the magnetic repulsion between the magnetic pallets and the magnetised structure. Each magnetised portion has an increasing monotone width. In particular, the width of the magnetised portions 38 increases, over the whole of their useful length, in a linear manner as a function of the angle at the centre. According to one advantageous variant, the periodic magnetised structure 36 is arranged such that its external perimeter is circular, the magnetised portions in an arc of a circle of this magnetised structure having the same configuration and being arranged in a circle around the axis of rotation of the escapement wheel.

In a general manner, each increasing ramp of potential magnetic energy is provided such that each of the two magnetic pallets can the climb it when the anchor is in a given rest position, of its two rest positions, and a force couple provided to the escapement wheel is substantially equal to a nominal force couple (case of a mechanical movement provided with a system at constant force for driving the escapement wheel) or within a range of values provided for ensuring the normal functioning of the horological movement (case of a standard mechanical movement having a variable force couple applied to the escapement wheel as a function of the degree of winding of the cylinder or cylinders if several are provided in series). The increasing ramps of potential magnetic energy are climbed when the anchor is subject to an alternative movement between its two rest positions and when the force couple provided to the escapement wheel is equal to said nominal force couple or within the range of values set for this force couple in normal functioning, successively by each of the first and second magnetic pallets while the anchor is respectively in its first and second rest positions, and alternatively by these first and second magnetic pallets during the alternative movement of the anchor. The two magnetic pallets and the increasing ramp of magnetic potential energy are arranged such that the anchor can be subject to a magnetic pulse of force in the direction of its movement, after any of the two magnetic pallets has climbed any of said increasing ramps of potential magnetic energy, when the anchor rocks from the rest position corresponding to this given ramp of potential magnetic energy towards its other rest position.

The periodic magnetised structure also defines for each of the two magnetic pallets magnetic barriers 46 which are situated respectively following the rising ramps of potential magnetic energy defined by the magnetised portions 38, these magnetic barriers being formed in particular by magnetised areas 46 of the structure 36, the radial dimension of which is substantially equal to or greater than the longitudinal dimension of each of the two magnets 30 and 32 forming the magnetic pallets of the anchor. In another variant, the magnetic barriers are not provided, the magnetised portions 38 then extending partially below the projecting parts 42 described in the follow.

The escapement wheel further comprises projecting parts which are associated respectively with rising ramps of potential magnetic energy. These projecting parts are formed by teeth 42 extending radially from a disk which is integral with the escapement wheel and situated above the disk 34 supporting the magnetised structure 36. These teeth are situated respectively following the magnetised portions 38, from the side of their broadest end, and are partially superimposed on corresponding magnetised areas 46. The teeth and the mechanical pallets are formed by a non-magnetic material. Preferably, the disk 40 is also formed by a non-magnetic material and is of the same material as the teeth.

In the advantageous variant shown, the teeth 42 extend in a general plane in which the two mechanical pallets 28, 29 of the anchor also extend. The two magnets 30, 32 are supported respectively by the two mechanical pallets and are also situated in said general plane. The FIGURES only show a lower magnetised structure, situated below the general plane. However, in an advantageous variant, the escapement wheel further comprises an upper magnetised structure, with the same configuration as the lower magnetised structure and supported by an upper disk, made preferably from a non-magnetic material. The lower and upper magnetised structures together form the periodic magnetised structure. They have the same magnetic polarity, opposite that of the two magnets of the anchor, and are arranged on either side of the geometric plane in which these two magnets forming the two magnetic pallets are situated, preferably at the same distance.

Before describing in more detail the subject-matter of the present invention, particular features of the escapement of the main embodiment will be described, which make it possible on the one hand to improve its behaviour during normal functioning (i.e. during stable functioning, intervening after a start-up phase, with a force couple $M_{RE}$ provided to the escapement wheel which is substantially equal to a nominal force couple or within a range of values provided for ensuring the normal functioning of the horological movement, in particular a correct rotation step-by-step of the escapement wheel) and, on the other hand, to obtain an auto-start-up of the assembly formed by the escapement and the mechanical resonator.

Firstly, the anchor 14 and the escapement wheel 16 are arranged such that, in normal functioning, one of the teeth 42 of the escapement wheel is subjected to at least one shock on one or other of the two mechanical pallets after the corresponding magnetic pallet has climbed any of the rising ramps of potential magnetic energy following the rocking of the anchor. This shock acts in such a way as to dissipate at least partially kinetic energy from the escapement wheel gained after said rocking. The teeth of the escapement wheel are provided so as to absorb the kinetic energy of this escapement wheel, at each step of the escapement wheel, after an accumulation of potential magnetic energy in the escapement for the next maintenance pulse of the mechanical resonator, and thus limit a termination oscillation during each step of its step-by-step rotation.

In a preferred variant, in normal functioning and once the escapement wheel is momentarily at a stop, a tooth 42 presses against a mechanical stop of the anchor formed by one or other of the two mechanical pallets. The escapement is therefore a hybrid escapement, i.e. magnetic and mechanical. Thus, for a standard movement, it is the case that, in normal functioning and for the whole range of PV M values of the force couple $M_{RE}$, the escapement wheel is immobilised momentarily, after at least one first shock of any of its teeth against any of the two mechanical pallets and before rocking following the anchor, to an angular stop position in which particular tooth presses against the particular mechanical pallet. Each angular stop position is thus defined by a tooth bearing against a mechanical pallet.

Then, the teeth 42 and the mechanical pallets 28, 29 are arranged such that during the rewinding of the barrel spring following a stop of the horological movement and allowing the escapement wheel 16 to turn again in the intended direction of rotation, at least one of the two mechanical pallets 28, 29 comes into contact with a tooth 42 of the escapement wheel, which are configured such that the escapement wheel can provide to the anchor 14 a mechanical start-up force couple and therefore a mechanical start-up pulse. Thus, an effective and rapid auto-start of the assembly formed by the escapement 12 and the mechanical resonator 2, and therefore of the mechanical horological movement, is made possible. In particular, the escapement wheel subjected to said start-up torque is not stopped by the contact between the tooth and the mechanical pallet concerned, but the tooth can transmit at least the majority of the start-up torque to the anchor.

In the advantageous variant represented in the FIGURES, each of the teeth 42 have, in a system of polar coordinates of the escapement wheel 16 which is centred on its axis of rotation, a first inclined surface which is inclined such that each of the first and second mechanical pallets 28, 29 can, in a start-up phase, slide on this first inclined surface while the escapement wheel traverses a range of corresponding angular positions e. The 'inclined surface' in a system of polar coordinates is defined as a surface which is neither radial nor tangential. Furthermore, each of the two mechanical pallets of the anchor, in the system of polar coordinates associated with the escapement wheel, has a second inclined surface when the pallet considered is in contact with one of the teeth 42 of the escapement wheel. The second inclined surface is configured such that each of the teeth 42 can, in a start-up phase, slide on this second inclined surface when the escapement wheel traverses a range of angular positions 8 which corresponds to a contact area between the tooth and the mechanical pallet considered.

In the following the specific subject-matter of the present invention will be described in more detail. With reference to the main embodiment described, the anchor 14 comprises:

- a single pivot axis 50 which is centred on a single geometric axis of rotation provided for the anchor;
- a rigid connecting portion 25 to which the pivot axis is fixed, which traverses said connecting portion and has conventionally at its two ends two pivots guided in rotation by two pierced stones;
- two arms 24 and 26 connected, at their first ends, to the connecting portion 25 and having respectively, at their seconds ends, the two mechanical pallets 28, 29 which are capable of coming into contact, at least during a certain functioning phase of the escapement, with any projecting part/tooth of the plurality of projecting parts/teeth 42 of the escapement wheel and which are arranged to be able to cooperate with these projecting parts, as explained above;
- a fork 18 having conventionally two horns 19*a*, 19*b* and arranged to cooperate with the mechanical resonator 2 via its pin 10 which is connected to the central axis 4 of this mechanical resonator; and
- a stick 20 connected at its first end to the connecting portion 25 and at its second end to the fork 18, this stick being free between its first end and its second end.

In an advantageous variant, the connecting portion, the stick and the two arms are formed by a one-piece part. In a preferred variant, the one-piece part is made from a metal material.

Figure 1B:
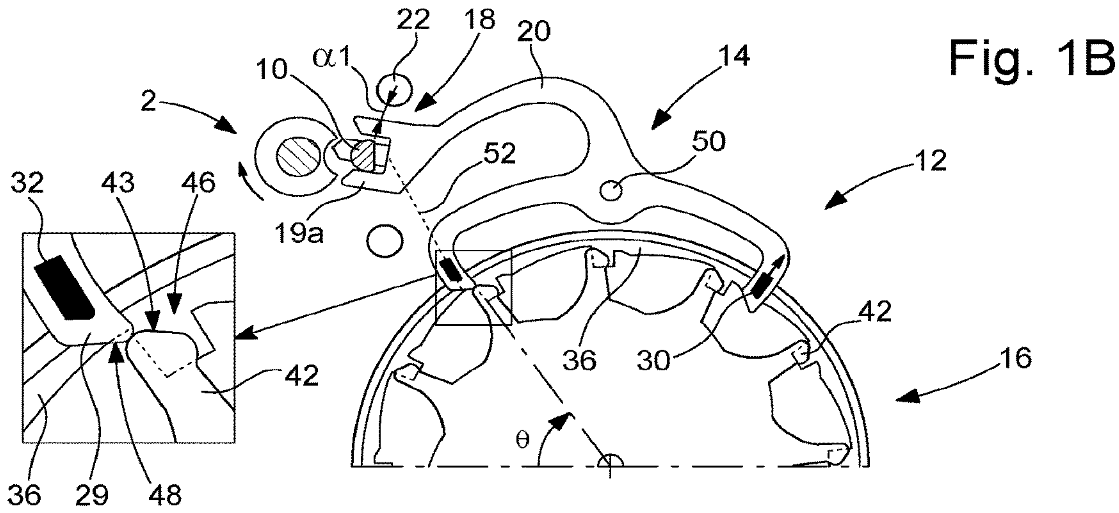

The incorporation of teeth 42 for permitting one and/or other of the two functions described above, namely the damping of oscillations of the escapement wheel during a step-by-step rotation of the latter in normal functioning and/or an auto-start of the assembly formed by the mechanical resonator and the escapement, in particular a magnetic type escapement, means that during the rocking of the anchor 14 from a first of its two rest positions in the direction of the second rest position while the escapement wheel 16 is positioned in any angular position 8 of a plurality of angular positions corresponding respectively to the plurality of teeth, one of the two mechanical pallets abuts against one of these teeth before the anchor can reach the angular disengagement position of the pin from the side of the second rest position, as represented in FIG. 1B. An 'angular disengagement position' for the pin of the mechanical resonator, in particular a spiral balance, is defined as the angular position (on either side of a median position defining a zero angular position for the anchor) from which the pin can disengage, for one reason or another, from the fork, i.e. exit the cavity formed by the two horns 19*a* and 19*b* without abutting against one of these horns to bring the anchor precisely to this disengagement position which acts before the anchor reaches one or other of its two rest positions. It should be noted, that this last fact results from a usual safety angle for ensuring that the pin can correctly exit the fork without being subject to shock or terminal friction which would make its lose energy with each alternation and would disrupt the oscillation of the mechanical resonator.

As already indicated, when the barrel spring relaxes, there is a moment when the horological movement ceases to functional normally given that the force couple that the cylinder can provide to the geartrain and to the escapement wheel becomes insufficient to ensure such normal functioning. At a certain moment, as shown in FIG. 1A, the escapement wheel 16 finally stops to turn step-by-step and comes to a stop in a certain angular position 8, but the mechanical resonator at this moment is always oscillating and can even have an essentially nominal and therefore relatively significant mechanical energy, especially in the case of an escapement 12 provided with the magnetic system described above. As mentioned in the preceding paragraph, in particular in the case of an escapement 12 provided with the magnetic system described above for providing magnetic maintenance pulses, the escapement wheel 16 can stop in any angular position 8 of a plurality of angular positions, corresponding respectively to the plurality of teeth 42, for which one of the two mechanical pallets then abuts against one of these teeth before the anchor can reach the angular position of disengagement of the pin, as represented in FIG. 1B. FIG. 1B shows a particularly unfavourable case where an end part 48 of the mechanical pallet 29 experiences a shock on top of the head 43 of a tooth 42 against which said mechanical pallet abuts. In such a case, the total force exerted by the anchor on the tooth 42 concerned is substantially radial, in a system of polar coordinates associated with the escapement wheel, such that the escapement wheel is not driven in rotation and experiences a significant shock.

It should be noted that the severe shock in question does not relate to the moment when the mechanical pallet and the tooth come into contact, but is a pulse of radial force which has a certain duration given that this shock takes place while the pin of the oscillating resonator is inserted between the two horns 19*a* and 19*b* of the fork 18 and a magnetic pulse is provided to the anchor. During the aforementioned shock, the pulse of radial force has several components, firstly a component originating from the inertia of the anchor 14 in movement which is stopped; secondly a main component due to the fact that the mechanical energy store in the mechanical oscillating resonator 2 which has stopped oscillating while its kinetic energy is virtually at a maximum, via the coupling between the fork 18 and the pin 10; and thirdly a magnetic component from the fact that the shock occurs while a magnetic pulse is provided to the anchor (indicated by an arrow in FIG. 1B). Thus, it is probable that when the end part 48 of the mechanical pallet 29 comes into contact with the head 43 of a tooth abutting against said head, it is the anchor 14 which drives the mechanical resonator 2 via its horn 19*b* bearing against the pin 10, and only then, after a very short time interval, said pin abuts against the horn 19*a* of the fork and then causes a strong deceleration due to the premature stop of the anchor in its rocking.

Figure 1C:
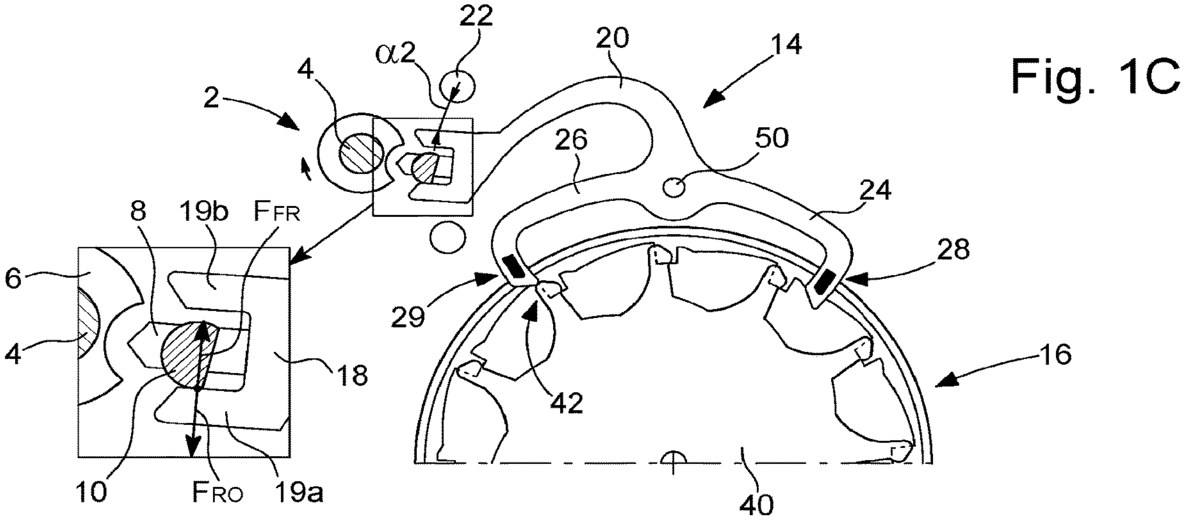

The more violent/high intensity the braking of the mechanical resonator during the aforementioned shock, the greater the force $F_{RO}$ exerted orthogonally on the horn 19*a* by the mechanical resonator, and by construction in a substantially tangential manner in a system of polar coordinates connected to the anchor, and the reaction force $F_{FR}$ of the anchor, which brakes this resonator, are strong at the start of the shock (direction of these forces represented in FIG. 1C). This poses a major problem, due to the fact that the anchor 14 is arranged and configured so as to be able to avoid the breakage or deterioration thereof, on one part of the escapement wheel or even on one part of the mechanical resonator during an event as shown in FIGS. 1A to 1C. To reduce the intensity of the force exerted by the pin of the resonator during said significant shock and therefore avoid an instantaneous constraint that is too violent, a relatively long-lasting shock is provided to reduce the intensity of the deceleration. Then, the anchor is arranged to be able to absorb elastically the energy that the mechanical resonator stopped in oscillation transmits thereto.

For this purpose, the anchor 14 is arranged so as to be able to bend, during rocking when a shock occurs as described above, in a general plane of the anchor parallel to the fork 18 (i.e. parallel, including merged, with a general plane in which the horns of the fork extend), by being subjected to an elastic deformation from the action of a force $F_{RO}$ exerted by the pin 10 engaged in the fork on one of its two horns 19*a*, 19*b* while the mechanical pallet concerned abuts against a tooth and the mechanical resonator is braked by the anchor. Furthermore, this anchor has an elastic capacity, between each of the two mechanical pallets 18, respectively 29 and the fork 18, allowing it to absorb elastically, during said elastic deformation, a maximum mechanical energy that the mechanical resonator 2 may have during the normal functioning of the horological movement. It should be noted that this elastic capacity has a certain safety margin, as during the shock there is some dissipation of energy in particular to the bearings of the escapement wheel, the mechanical resonator and the anchor, and also the various structures concerned, in particular the disk 40. Any breakage or damage to the escapement and the mechanical resonator can thus be avoided. 'Elastic capacity' defines a capacity for absorbing elastic energy. Due to the features of the anchor according to the invention, a brutal shock is avoided and a progressive dissipation of the mechanical energy of the mechanical resonator is permitted.

At the time of a first shock between a mechanical pallet and a tooth of the escapement wheel which is involved in the situation described above, the anchor is subjected to an elastic deformation so as to be able to absorb the majority of the mechanical energy of the mechanical resonator, even if this mechanical energy corresponds to a nominal energy in normal functioning of the horological movement. In the variant shown, the stick 20 is arranged so as to be able to substantially absorb said majority of the mechanical energy of the mechanical resonator. In the represented variant, the stick is provided to be curved, in particular with a general 'swan's neck' form. Other forms are possible, also a substantially straight stick. The curved configuration has an advantage due to the fact that it makes it possible generally to increase the length of the stick between the connecting portion 25 and the fork 18. The 'swan's neck' form makes it possible to have relatively long stick, while the fork is relatively close to one of the two mechanical pallets. In a configuration with a relative positioning of the central axis 4 of the resonator as shown in the FIGURES, a person skilled in the art would connect the shortest fork to the arm 26, in the extension of the mechanical pallet 29. Thus, there would be almost no absorption of kinetic energy from the oscillating resonator.

In the particular variant shown, a median geometric line of the anchor 14 between an end surface (terminal inclined plane) of each of the two mechanical pallets 28, 29 and the fork 18, has a total length, over the two sections 20*a* and 24*a*, respectively 20*a* and 26*a* which are defined by the mechanical pallet considered together with the corresponding arm 24 or 26 and by the stick 20 (see broken dashed lines in FIG. 1A), which is at least twice the length of a straight line 52 between a point of the median geometric line 24*a* on the closest end surface of the fork and the middle of the base of a cavity defined by the two horns of this fork (see FIG. 1B). The elastic deformation capacity can be provided over the whole length defined above or only on portions of this total length. Thus, in a first variant, the stick and the arms have an elastic deformation capacity, which can be different, while in a second variant, it is substantially the stick which has this elastic capacity. In a third variant, it is essentially the arms 24 and 26 which have an elastic capacity.

The anchor therefore needs to have an elastic deformation capacity and a fairly significant capacity for absorbing elastic energy, these associated capacities being a function of several parameters that a person skilled in the art would know to select and determine to obtain the desired values. As already mentioned, the form can play a role, thus the length of the material path between the mechanical pallets and the fork. Other parameters also play a role, in particular the selected material and the various transverse sections. It should be noted that the minimum transverse section of the anchor also plays a role, which does have to be too small, facilitating the flexibility of a portion of the anchor to the detriment of the absorption of elastic energy. In the main embodiment described, magnetic pulses for maintaining the oscillation of the mechanical resonator are generated at the two mechanical pallets 28, 29 which support respectively two magnets 30, 32 forming two magnetic pallets. Thus, the anchor 14 is arranged, during the normal functioning of the horological movement and therefore of the escapement, to be able to transmit essentially a magnetic force couple, created by each of the magnetic pulses, to its fork for maintaining an oscillation of the mechanical resonator. It should be noted that this condition can easily be implemented due to the fact that the amount of energy in a magnetic pulse is much lower than the mechanical energy that the mechanical resonator 2 has in normal functioning.

Figure 1D:
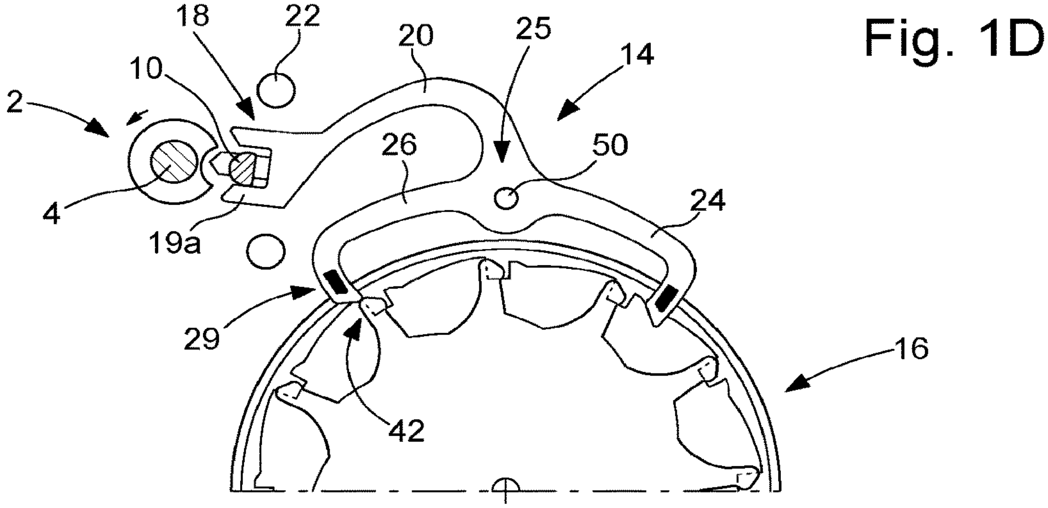

Lastly, with reference to FIGS. 1B to 1F a succession of events occurring at various specific moments are described for a hypothetical case where the escapement wheel 16 stops in the disadvantageous position represented in FIG. 1A and remains in this position until the mechanical resonator 2 stops. In FIG. 1B, as indicated above, the pin 10, having penetrated the fork 18, abuts against the horn 19*a* while the anchor is stopped in its movement from the rest position where the fork bears against the peg 22 towards the rest position where said fork is provided bearing against the peg 21. At the start of the shock between the mechanical pallet and the tooth, the angle at the centre of rotation of the anchor between the horn 19*b* and the peg 22 has a certain value $\alpha\mathbf{1}$. The resonator having at this moment a nominal and therefore significant mechanical energy, essentially in the form of kinetic energy, it then presses against the horn 19*a* by exerting a degressive force $F_{RO}$, while the anchor, here especially the stick 20, bends by absorbing the majority of the kinetic energy of the resonator in the form of elastic energy. The angle defined above therefore increases, as shown in FIG. 1C where its value $\alpha\mathbf{2}$ is greater than value $\alpha\mathbf{1}$, for example approximately a double value, FIG. 1C showing a configuration when the mechanical resonator has lost the majority of its speed (and therefore its kinetic energy). Then, without fail before the pin 10 reaches the disengagement angle which will allow it to exit the fork, the mechanical resonator passes through an angular stop position and a premature inversion of the direction of its movement, as shown in FIG. 1D where the resonator rotates in anticlockwise direction while it rotated previously in clockwise direction. From the action of the anchor via the horn 19*a*, the resonator recovers the majority of the elastic energy stored in the anchor and thus experiences an acceleration which leaves it a certain oscillation amplitude, although less than it had before the shock.

Figure 1E:
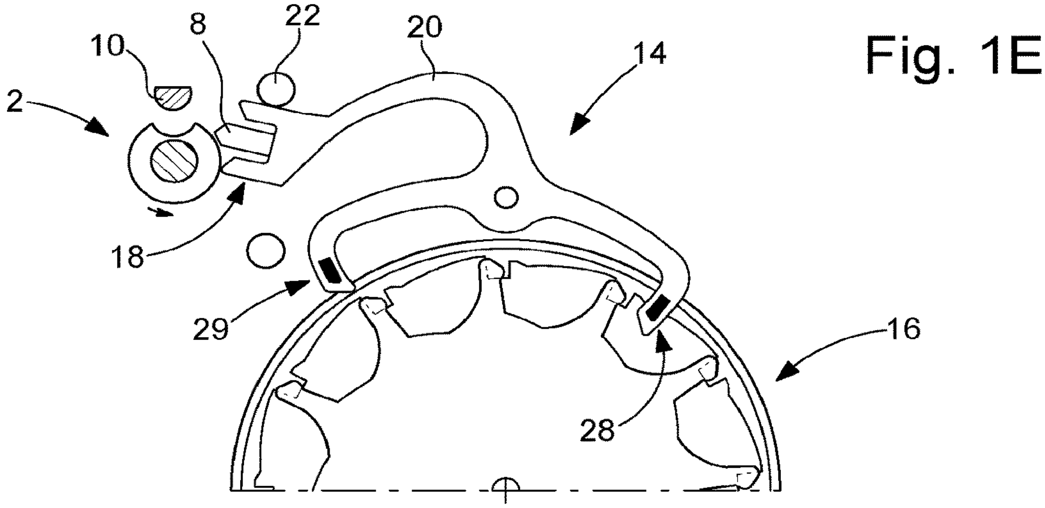
Figure 1F:
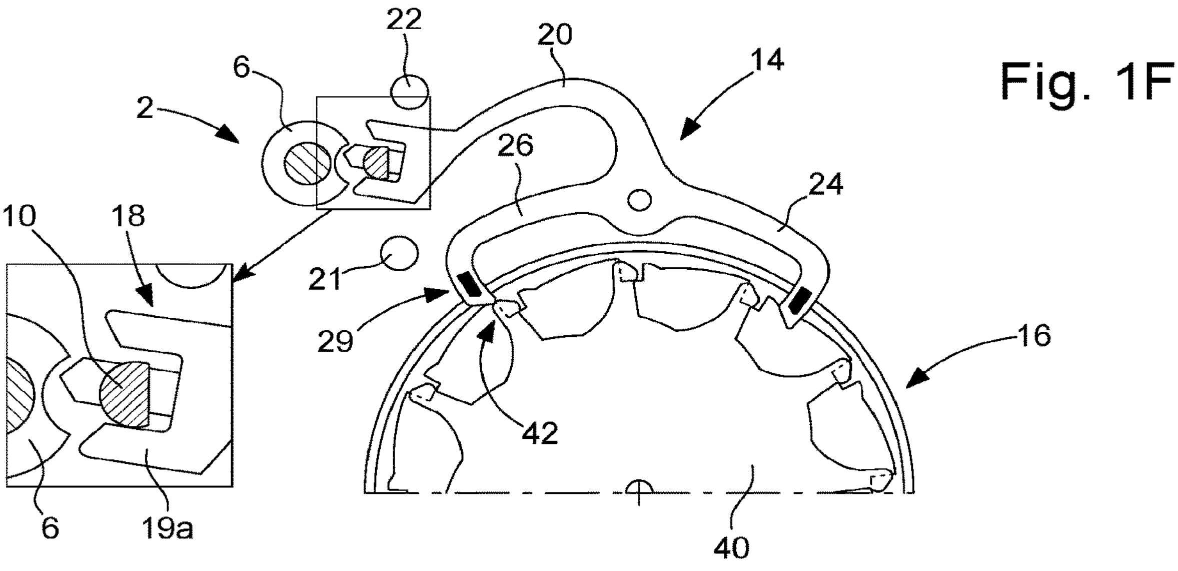

By disengaging from the fork 18, propelled by the stick 20 of the anchor 14, the pin 10 can then exit the fork, as shown in FIG. 1E. Then, during a following alternation, a new sequence, similar to the one shown with reference to FIGS. 1A to 1E, operates again. However, the mechanical resonator 2 having lost energy during the first shock, then causes a smaller flexion of the anchor 14. The oscillation of the mechanical resonator is thus rapidly damped and ends up stopping, as represented in FIG. 1F, without having damaged the mechanical movement, in particular the hybrid escapement.

The invention claimed is:

1. A horological movement comprising:

a mechanical resonator; and an escapement which is connected to said mechanical resonator, the escapement comprising an escapement wheel, which has a plurality of projecting parts, and an anchor which is separated from the mechanical resonator and which has a single geometric axis of rotation; the mechanical resonator being coupled to the anchor such that when said mechanical resonator is maintained in oscillation, the anchor is subject to an alternative rocking movement between first and second rest positions wherein the anchor rests alternatively during successive time intervals, wherein the anchor comprises:

a single pivoting axis centered on said single geometric axis of rotation, a rigid connecting portion to which the pivoting axis is fixed, two arms connected, at firsts ends thereof, to the connecting portion and having respectively, at a second end thereof, a mechanical pallet which is each able to come into contact with any projecting part of the plurality of parts projecting from the escapement wheel and which are arranged to cooperate with the projecting parts at least in a start-up phase or during normal functioning of the horological movement, a fork having two horns and arranged to cooperate with the mechanical resonator via a pin integral with an axis of said mechanical resonator, and a stick with a first end connected to said connecting portion and a second end connected to the fork, said stick being free between the first end thereof and the second end thereof;

wherein, during rocking of the anchor from the first rest to the second rest position while the escapement wheel is positioned in any angular position of a plurality of ranges of angular positions corresponding respectively to said plurality of projecting parts, one mechanical pallets abuts against one of the projecting parts before the anchor can reach an angular position of disengagement of the pin from a side of the second rest position, wherein the anchor is arranged, during said rocking of the anchor, to be able to bend in a general plane of the anchor parallel to the fork, by being subjected to elastic deformation from the action of a force exerted by the pin engaged in the fork on one of the two horns of the fork while said one of the mechanical pallets abuts against said one of the projecting parts and the mechanical resonator is braked by the anchor; said anchor having an elastic capacity, between each of the mechanical pallets and the fork, enabling the anchor to absorb elastically, during said elastic deformation, a maximum mechanical energy which the mechanical resonator can have during the normal functioning of the horological movement; and wherein the escapement comprises a magnetic system magnetically coupling the escapement wheel and the anchor, the magnetic system including a magnet supported at each of the mechanical pallets, and a periodic magnetized structure arranged on a disk, the periodic magnetized structure being provided on the escapement wheel.

2. The horological movement according to claim 1, wherein the escapement or a drive mechanism of the escapement wheel is arranged such that, during nominal functioning of the horological movement, the escapement wheel provides to the anchor maintenance pulses of an oscillation of the mechanical resonator which have a substantially constant energy while the horological movement functions normally.

3. The horological movement according to claim 2, wherein said magnetic system is arranged so as to generate, during the normal functioning of the horological movement, magnetic pulses which form said maintenance pulses at constant energy.

4. The horological movement according to claim 3, wherein the projecting parts are arranged so as to permit an absorption of kinetic energy of the escapement wheel by shocks, between the projecting parts alternatively with the mechanical pallets, respectively at an end of successive steps of a step-by-step rotation of the escapement wheel during the normal functioning of the horological movement.

5. The horological movement according to claim 3, wherein the projecting parts are arranged so as to permit an auto-start of the assembly formed by the mechanical resonator and the escapement when a barrel spring is reset, following a stop of the horological movement, and the escapement wheel is again driven in rotation.

6. The horological movement according to claim 3, wherein said magnetic pulses are generated at the mechanical pallets supporting the magnets; and wherein the anchor is arranged, during the normal functioning of the horological movement, to be able to transmit substantially a magnetic force couple generated by each of the magnetic pulses to the fork to maintain an oscillation of the mechanical resonator.

7. The horological movement according to claim 1, wherein said stick is curved.

8. The horological movement according to claim 1, wherein a median geometric line of the anchor, between an end surface of each of the mechanical pallets and the fork, has a total length, over two sections defined respectively by the mechanical pallet considered together with the corresponding arm and by the stick, which is at least double a length of a straight line between a point of the median geometric line on said end surface and a middle of a base of a cavity defined by the two horns of the fork.

9. The horological movement according to claim 1, wherein the connecting portion, the stick and the two arms are formed by a one-piece part.

10. The horological movement according to claim 9, wherein said one-piece part is made from a metal material.

* * * * *